United States Patent [19]

Dvorak

[11] 4,425,726

[45] Jan. 17, 1984

[54] EAR TAG FOR ANIMALS

[76] Inventor: Edward E. Dvorak, P.O. Box 79, Manning, N. Dak. 58642

[21] Appl. No.: 359,232

[22] Filed: Mar. 18, 1982

[51] Int. Cl.³ .............................................. G09F 3/00
[52] U.S. Cl. ..................................................... 40/301
[58] Field of Search ................. 40/300, 301, 302, 20, 40/10 PM, 20 R; 119/156

[56] References Cited

U.S. PATENT DOCUMENTS

| 344,241 | 6/1886 | Boyden et al. | 40/301 |
| 361,987 | 4/1867 | Clark | 40/301 |
| 1,376,223 | 4/1921 | Pannier | 40/301 |
| 2,940,199 | 6/1960 | Goldberg | 40/301 |
| 4,021,952 | 5/1977 | Brierly | 40/301 |

FOREIGN PATENT DOCUMENTS

| 53212 | 6/1937 | Denmark | 40/301 |
| 51597 | 5/1930 | Norway | 40/301 |

Primary Examiner—Gene Mancene
Assistant Examiner—Wenceslao J. Contreras
Attorney, Agent, or Firm—Shlesinger, Arkwright, Garvey & Fado

[57] ABSTRACT

An identification tag for application to an ear of cattle or other animals which includes a body portion of elongated shape constructed of a semi-flexible plastic material for adherence to the curved contour of the portion of the ear to which the tag is attached. A plurality of fastening members secure the tag to the ear for securely holding the tag in position, the head of at least one of the securing members being molded into the tag body. A second fastening member may extend through a longitudinal slot in the tag body in order to allow for growth of the ear in the case of young animals.

11 Claims, 5 Drawing Figures

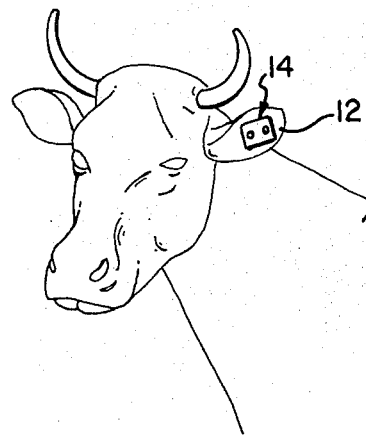
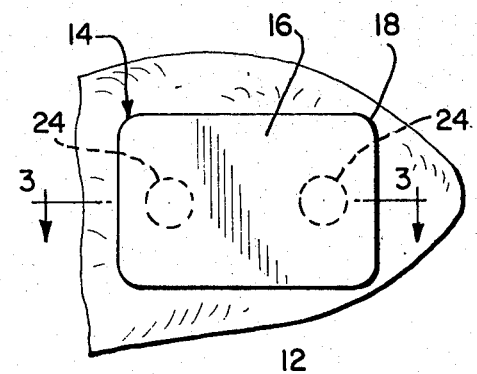
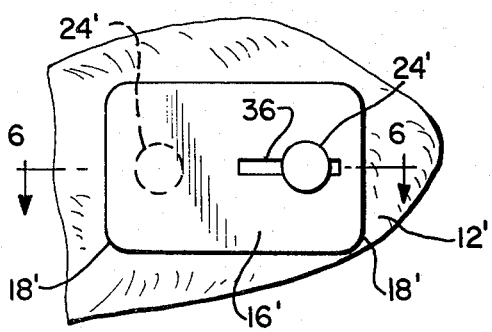
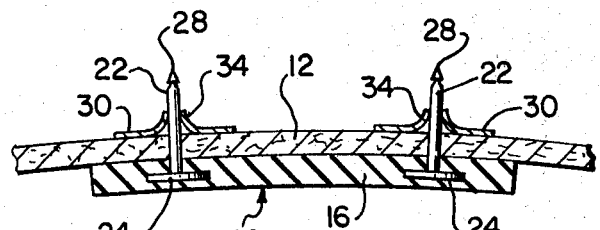
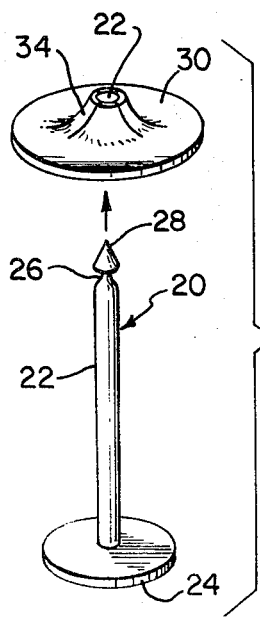
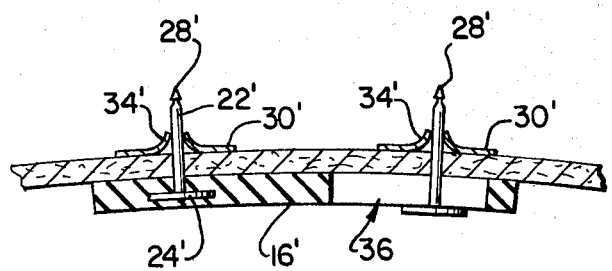

EAR TAG FOR ANIMALS

BACKGROUND OF THE INVENTION

It is conventional practice to place identification tags on the ears of livestock in a herd. These tags are usually of the hang type which are fixed at one point to a lower portion of the ear and hang downwardly therefrom. It has been found that, in time, these hang tags are lost, due principally to the snagging of the tags in bushes or other objects in the field, which pull the tag from the ear.

Other tags have been designed, such as shown in U.S. Pat. No. 1,376,223 wherein a tag is secured wholly within the ear of the animal, the tag including a plate, the two opposite ends of which are provided with prongs which pass through the ear and are secured to a keeper plate. However, this tag is not designed to assume the contour of the portion of the ear to which it is attached, nor does it afford the type of securing means which will possitively preclude disengagement from the tag ear.

SUMMARY OF THE INVENTION

The ear tag of the present invention is designed to be placed wholly within the ear of the animal, and constructed of a semi-flexible material which will assume the generally arcuate shape of the animal's ear, and therefore lie flush against the same at all times. The tag is of elongated shape and is secured in position by at least two fastening members which extend through the tag body and the ear to securely hold the body in contiguous relation with the ear. The body of the tag is preferably of a molded plastic construction, the head of at least one of the fastening members being embedded in the plastic material to securely hold the same in position and to allow a greater surface area for placement of indicia thereon.

It is also within the contemplation of the present invention to provide a pair of securing members wherein the heads of both of the members are embedded in the molded plastic material. Alternatively, one of the securing members may be movably positioned in a longitudinal slot in the body of the tag so that, when the tag is affixed to the ear of a young animal, space is provided for allowing the movement of the tag to accommodate the ear growth.

DESCRIPTION OF FIGURES OF THE DRAWING

FIG. 1 is an elevational view of the ear tag of the present invention illustrating its use;

FIG. 2 is an enlarged front elevational view of the ear tag of the present invention shown attached to the ear of an animal;

FIG. 3 is a sectional view taken along the line 3—3 of FIG. 2, looking in the direction of the arrows;

FIG. 4 is an exploded view of a securing member forming a part of the present invention;

FIG. 5 is a view similar to FIG. 2 showing a modified form of the present invention, and FIG. 6 is a sectional view taken along the line 6—6 of FIG. 5, looking in the direction of the arrows.

DESCRIPTION OF THE INVENTION

In FIG. 1, there is illustrated an animal having an ear 12 to which an identification tag 14 is applied.

In the form of the invention illustrated in FIGS. 1 to 4, ear tag 14 includes a body 16 of elongated rectangular construction, having rounded corners as indicated at 18, and being preferably made of a semi-flexible plastic material, such as thermoplastic resin, in order that the tag may assume the contour of the animal's ear when placed in position, and will resist the elements. The tag is preferably of substantial size such as 2¾ inch long by 2 inches wide and approximately ⅛ inch thick, although any size desired may be employed. It is a feature of the present invention to provide a pair of like securing members generally designated 20 for holding the identification tag firmly secured to the ear of the animal, which securing member is shown to advantage in FIG. 4. Securing member 20 includes an elongated shank 22 to one end of which is affixed a circular head of disk shape 24. The opposite end of the shank is reduced to provide an annular groove 26 beyond which is a conical-shaped point 28 which facilitates piercing of the animal's ear.

In combination with the securing member there is provided a disk-shaped fastener 30, the central portion of which is struck to provide a central opening 32 and a plurality of upstanding spring leaves 34 adapted to engage shank 22 for holding the securing member in engagement with the animal's ear, as shown to advantage in FIG. 3.

Securing member 20 is preferably molded integrally with body 16 of the tag so that head 24 of the securing member is countersunk in body 16 and is covered by a layer of plastic material comprising part of the tag body, as shown to advantage in FIG. 3. This affords a greater outer surface area on which to place indicia identifying the particular animal, and also prevents accidental disengagement of the securing member from the tag during shipment, and prior to application to the ear of the animal.

In FIGS. 5 and 6, there is illustrated a modified form of the present invention which is particularly adapted for application to young animals, which tag is so designed to allow for the growth of the animal's ear without removal and replacement of the tag, and without discomfort to the animal which might otherwise occur. In this form of the invention, portions thereof which are similar to those disclosed in the form of invention illustrated in FIGS. 1 to 4, are identified by like, primed numbers.

In accordance with the form of invention illustrated in FIGS. 5 and 6, there is provided a longitudinal slot 36 which preferably extends from a point midway of the length of the tag body to a point adjacent one end thereof, as shown in FIG. 5.

It is a salient feature of this form of the invention to embed the head of one of securing members 20' in tag body 16' but, as shown to advantage in FIG. 6, the shank 22' is freely movable in slot 36, and the head 24' engages the outer surface of tag body 16' adjacent the slot. In this form of the invention, therefore, head 24' is not embedded in body 16', in order to allow relative movement of the securing member with respect to tag body 16' as the ear 12' of the animal grows.

In both forms of the invention, the ear tag is attached to the ear in conventional fashion, preferably by placing the tag and the securing member attached thereto proximate the upper end of the ear and near the outermost extreme thereof, so that the hair of the animal within the ear will not grow over, and obscure, the tag. The ear is pierced by the conical-shaped point 28 of each securing member 20, 20' following which fastening member 30, 30' is attached to shank 22, 22' in a manner to effect retaining engagement of leaves 34, 34' with the shank, the fastening members being in contiguous engagement with the back of the ear.

As will be noted from a consideration of FIGS. 3 and 6, the semi-flexible nature of the plastic body enables the same to assume the contour of the animal's ear which can vary considerably in curvature. By using a plastic material such as a thermoplastic resin, the tag may be made of any color desired, thereby facilitating color coding thereof for identification purposes. Also, the embedding of the heads of the securing members in the face of the tag body affords a greater surface area for application of indicia thereto by means of a writing instrument, or by labeling.

The ear tag of the present invention is of simple, economic construction which is capable of withstanding the elements and the abuse of being struck by foreign objects, will not harm or cause discomfort to the animal, and will last for the lifetime of the animal. The present tag is additionally easily applied to the animal's ear and, once applied, remains in fixed, flush engagement with the curved surface of the ear without loosening and without any adjustment required due to age or growth of the animal.

While there has been herein shown and described the presently preferred forms of this invention, it is to be understood that such has been done for purposes of illustration only, and various changes may be made therein within the scope of the appended claims.

What I claim is:

1. An animal ear tag including:
   (a) a body portion adapted to be positioned wholly within the ear of the animal
   (b) said body portion being made of a flexible material characterized by being adapted to follow the contour of the ear and lying in flush engagement therewith
   (c) said body portion being provided with an elongated slot disposed longitudinally of said body portion
   (d) spaced securing members extending through said body portion and being adapted to pass through the ear for holding the tag in place
   (e) one of said securing members passing through the elongated slot of the body portion and movable therein relative to said body portion as the animal ear grows;
   (f) the other of said securing members being in fixed relation to said body portion so as to prevent accidental displacement of said other securing member from said body portion.

2. The animal ear tag of claim 1, wherein
   (a) said body portion is of generally rectangular shape having rounded corners.

3. The animal ear tag of claim 1, wherein
   (a) said body portion is made of molded plastic material, and
   (b) the other of said securing members is molded integrally with said body portion.

4. The animal ear tag of claim 1, wherein
   (a) each of said securing members includes a shank which is adapted to extend through said body portion and is adapted to pass through the ear of the animal.

5. The animal ear tag of claim 4, wherein
   (a) each of said securing members includes a head secured to one end of each of said shanks and engaged with said body portion.

6. The animal ear tag of claim 5, wherein
   (a) the head of the other of said securing members is embedded in said body portion and recessed from one face thereof, to prevent accidental displacement of said other securing member from said body portion and to provide a smooth uninterrupted surface on said face of the body portion for the application of indicia thereto.

7. The animal ear tag of claim 4, wherein
   (a) each of said securing members includes fastening means engageable with said shank for holding said securing members in position to retain said body portion in flush engagement with the ear.

8. The animal ear tag of claim 7, wherein
   (a) said fastening means includes a disk
   (b) a central portion of said disk being struck to provide an opening through which said shank passes, the opening being surrounded by a plurality of spring leaves for engaging said shank and fixedly holding the same in position.

9. An animal ear tag including
   (a) a body portion of generally rectangular shape adapted to be positioned wholly within the ear of the animal
   (b) said body portion being made of a flexible molded plastic material characterized by being adapted to follow the contour of the ear and lying in flush engagement therewith
   (c) said body portion being provided with an elongated slot disposed longitudinally of said rectangular body portion, and
   (d) transversely spaced securing members extending through said body portion and ear for holding the tag in place
   (e) each of said securing members including a shank having a head at one end, one of which shanks extends through the elongated slot of the body portion and is movable therein relative to said body portion as the animal ear grows
   (f) the shank of the other of said securing members being molded in said body portion with the head thereof embedded therein and recessed from one face thereof, to prevent accidental displacement of said other securing member from said body portion and to provide a smooth uninterrupted surface on said face of the body portion for the application of indicia thereto.

10. The animal ear tag of claim 9, wherein
    (a) each of said securing members includes fastening means engageable with said shank for holding said securing members in position to retain said body portion in flush engagement with the ear.

11. The animal ear tag of claim 10, wherein
    (a) said fastening means includes a disk
    (b) a central portion of said disk being struck to provide an opening through which said shank passes, the opening being surrounded by a plurality of spring leaves for engaging said shank and fixedly holding the same in position.

* * * * *